United States Patent [19]
Pferd, III et al.

[11] Patent Number: 4,677,683
[45] Date of Patent: Jun. 30, 1987

[54] SYSTEM FOR CORRECTING ERRORS IN THE DIMENSIONAL LOCATION OF FIBERS IN AN OPTICAL FIBER SCANNING HEAD

[75] Inventors: William Pferd, III, Mendham; Joshua Milow, Fairlawn; Thomas A. Booth, Flanders, all of N.J.

[73] Assignee: Skantek Corporation, Warren, N.J.

[21] Appl. No.: 609,300

[22] Filed: May 11, 1984

[51] Int. Cl.⁴ .............................................. G06K 9/20
[52] U.S. Cl. ..................................... 382/65; 250/227; 382/67
[58] Field of Search ....................... 382/65, 67, 44, 45, 382/50; 250/227; 358/285, 293, 286; 235/461, 473

[56] References Cited

U.S. PATENT DOCUMENTS

| | | | |
|---|---|---|---|
| 3,872,434 | 3/1975 | Duvall et al. | 382/50 |
| 3,962,681 | 6/1976 | Requa et al. | 382/50 |
| 4,249,217 | 2/1981 | Korte et al. | 382/67 |
| 4,558,372 | 12/1985 | Culter | 358/293 |
| 4,570,063 | 2/1986 | De Bie et al. | 250/227 |

Primary Examiner—Leo H. Boudreau
Assistant Examiner—Joseph Mancuso
Attorney, Agent, or Firm—Philip Young; Alan H. Levine

[57] ABSTRACT

A system for correcting the manufacturing errors and variations in the positional alignment and spacing of optical fibers in the scanning head of an automatic digitizing system. A scan head signature is produced by measuring the actual X and Y position for each optical fiber including the variation of each fiber from its nominal X and Y positions. An X correction circuit and a Y correction circuit use the head signature data stored in a signature correction memory to correct the X and Y positions of the stream of scan line data to thereby provide a true video scan of the document data.

15 Claims, 18 Drawing Figures

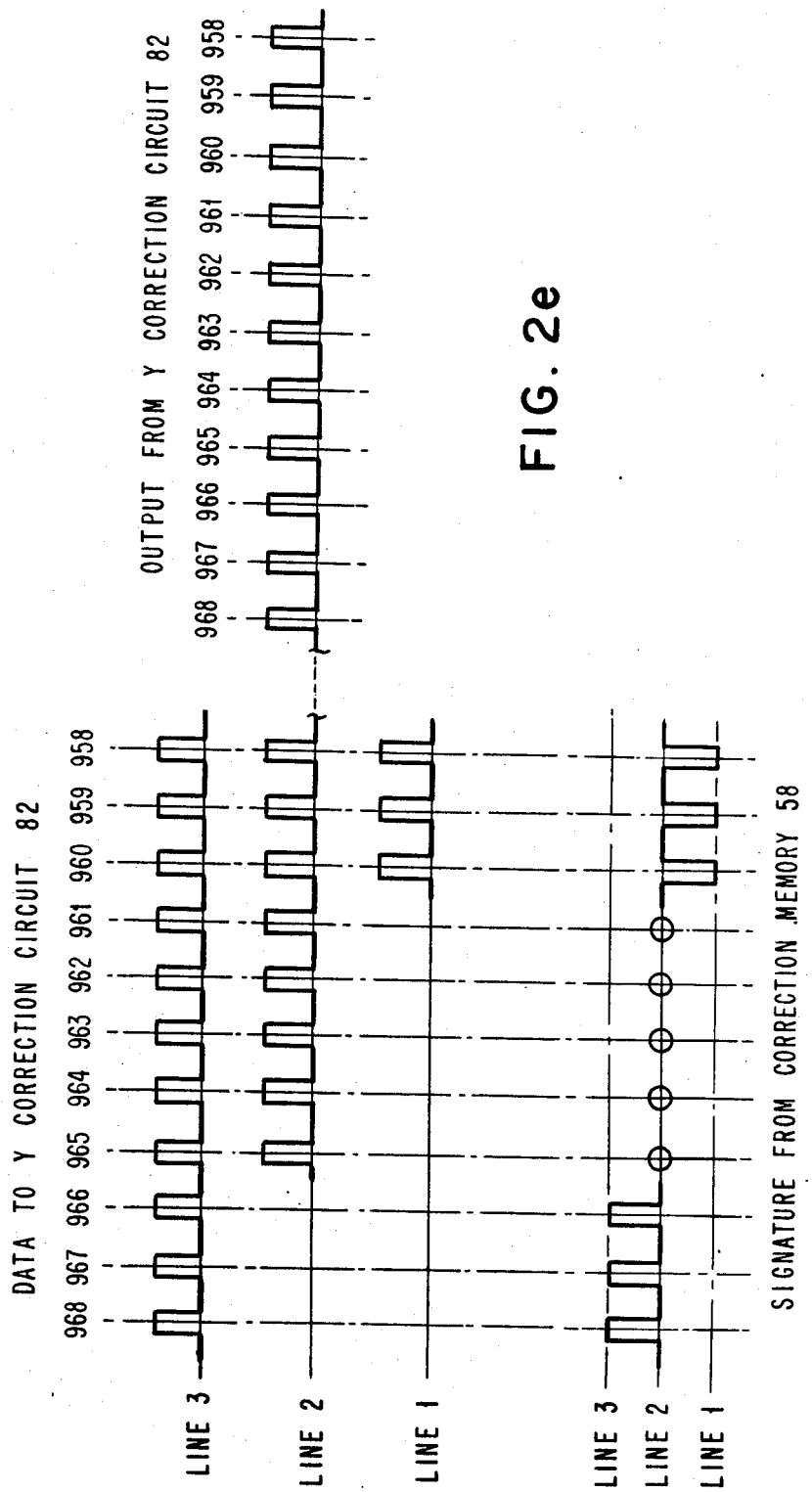

FIG. 4b SCANNED DATA OF MARK WITHOUT SIGNATURE CORRECTION

FIG. 4c SCAN HEAD SIGNATURE - Y DIRECTION

ETC.,+1,+1,+1,+1,0,0,0,0,0,-1,-1,-1,-1,-1,-1,0,0,0,0,+1,+1,+1,+1,+1,+1, ETC.

FIG. 4d SCANNED DATA OF MARK WITH SIGNATURE CORR.

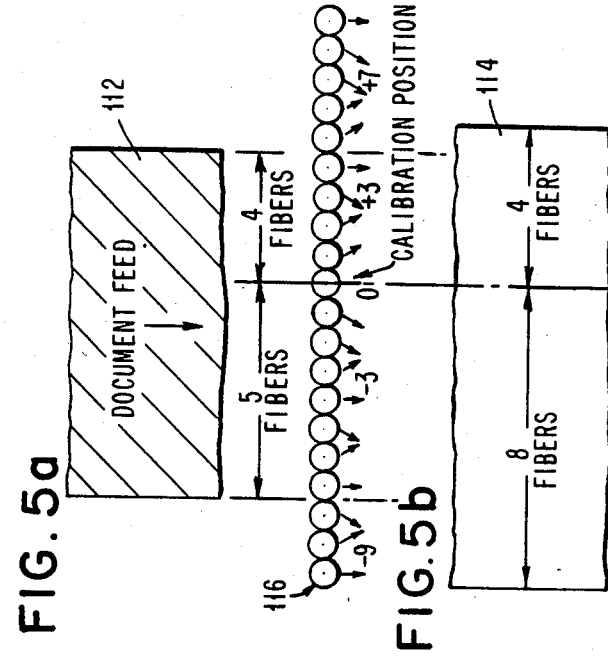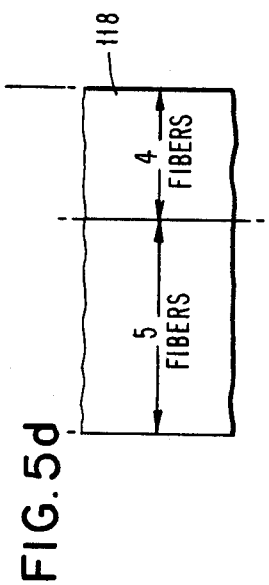

SYSTEM FOR CORRECTING ERRORS IN THE DIMENSIONAL LOCATION OF FIBERS IN AN OPTICAL FIBER SCANNING HEAD

TECHNICAL FIELD

The present invention relates to optical fiber scanning heads used in a video scanning system for documents and, more particularly, to a system for correcting the alignment errors of the optical fibers in a scanning head.

BACKGROUND ART

Automatic data capture has been a continuing and growing concern in the field of drafting and design automation since the start of computer aided design (CAD) systems. One longstanding problem has been how to maintain millions of large engineering drawings by converting the physical drawings into a CAD system for automatic data updating and how to avoid degradation of the file material. In one known type of large document automatic data capture system, two linear arrays of optical fibers are positioned in a scanning head parallel to each other and extending along the width of the scanning head which may, for example, be 1 meter wide. The scanner uses the optical fibers to pipe light from the scanned media to an electronic image sensor. The electronic signals are in digitized form and converted to a CAD formatted file and stored.

Optical fibers of either glass or plastic are made by continuous processes that employ feed-back arrangements to control the fiber diameter. These methods result in the diameter being held to plus or minus a few microns about a nominal dimension. The linear arrays of fibers for scanners are constructed so that the fibers touch each other as they are wrapped on a rotating drum. Because of the variation in diameter of the fiber, the nominal design spacing of fibers in the linear array varies across an array and from array to array. Due to this effect, it is state-of-the-art to have, for example, a tolerance of ±25 mm for a 1 meter wide array. This variation results in the array having a variable scanning resolution or fiber-to-fiber spacing that is not acceptable for precision scanners.

When the linear array is placed onto a flat bar for support, a second type of variation in the fiber position occurs. In manufacture of this type of assembly, the fibers are adhered to the support bar with epoxy resin. The location of the fibers from the bar is dependent on the thickness of the adhesive epoxy. Due to this effect, it is typical in the state-of-the-art to have a tolerance of ±1 fiber diameter for the location of a fiber from a nominal straight line.

In one proposed system, the opposite ends of the linear array fibers in a sensor subassembly are terminated in a manner that facilitates detection of light signals. The signals in the linear array are detected by electronic photodiodes or charge coupled devices (CCD) that are focused onto the fiber ends. According to one design, the fibers are terminated in a grid with uniform spacing that matches in accuracy the spacing of the device sites in a matrix CCD. The lens in a camera assembly that contains the CCD device focuses the CCD onto the optical fiber ends in the grid array. Scanning of each fiber is accomplished by commercially available circuitry, such as that manufactured by the Reticon Corporation.

Since the camera circuits are electronically precise and scan each fiber in sequence, the captured data is accurate in timing. However, because of the translation from linear data obtained from the document to grid data at the camera, the data at the CCD is not true in the physical spacing of the data sites.

In view of the above, it is an object of the present invention to provide a method and a system for correcting the manufacturing variations that occur in the positional alignment and spacing of optical fibers in an optical fiber scanning head.

It is another object to provide an optical fiber scanning and automatic digitizer system which permits high precision scanned data to be obtained from a relatively low precision optical fiber scanner.

It is another object to provide an optical fiber scanning and automatic digitizer system which corrects, at high speed, the manufacturing variations in the positional alignment and spacing of optical fibers of the scanner while the data is binary form.

It is another object to determine the scan head signature of an optical fiber scanning head in the form of the actual X and Y positional locations of each fiber and their variation from their nominal X and Y positions with respect to its base line caliberation positions, and to compensate for such variations to obtain acceptable performance for each fiber of the optical fiber scan head.

SUMMARY OF THE INVENTION

These and other objects are achieved by the present invention which provides in a document video scanning system, a method and system for correcting the manufacturing errors and variations in the positional alignment and spacing of optical fibers in the scanning head. The method and system comprises first determining a scan head signature by measuring and storing the actual X and Y positional data for each optical fiber including the variation of each fiber from its nominal X and Y position with respect to its X and Y base line caliberation position. Such scan head signature data is stored in a signature correction memory on a computer storage media, such as in the form of a computer code format on a magnetic tape or a magnetic diskette. The next step of the method involves scanning consecutive lines on a document with such optical fiber scanning head to produce a stream of digital signal scan line data. Next, an X correction circuit and a Y correction circuit use such head signature data stored in such signature correction memory to correct the X and Y positions of the stream of scan line data to thereby provide a true video scan of the document data.

In one embodiment of the present invention, the X and Y scan head signature is converted to binary positional data assigned to each numbered optical fiber with respect to a nominal straight line in the case of Y directional data, or with respect to the nearest multiple of the fiber diameter in the case of X directional data. Such binary head signature correction data assigned to each optical fiber is used in the document scanning and automatic digitizer system.

Thus, the method and system of the present invention corrects for the manufacturing variations that occur in the positional alignment and spacing of optical fibers in the scanning head, resulting in high precision scanned data that is obtained from a relatively low precision optical fiber scanner head.

BRIEF DESCRIPTION OF THE DRAWINGS

FIG. 2(e) graphically shows the "Y" correction process for using pulse signature correction data to generate a "Y" corrected pulse stream;

FIG. 4(b) shows the resulting scanned data without signature correction;

FIG. 4(c) shows the Y direction signature of the scan head in binary form for the fibers indicated in the Figure; and FIG. 4(d) shows the resulting scanned data when signature correction is applied;

FIG. 5(a) shows a document mark to be scanned and a linear optical fiber array where the optical fibers on the scan head are less than the nominal fiber diameter;

FIG. 5(b) shows the scanned data of the document mark without signature correction;

FIG. 5(c) shows the scan head signature in the X direction; and

FIG. 5(d) shows the scanned data of the document mark when signature correction is applied;

FIG. 6(a) shows a document mark to be scanned and a linear optical fiber array where the optical fibers on the scan head are dimensioned more than the nominal optical fiber diameter;

FIG. 6(b) shows the scanned data of the document mark without signature correction;

FIG. 6(c) shows the scan head signature in the X direction; and

FIG. 6(d) shows the scanned data of the document mark when signature correction is applied.

DESCRIPTION OF THE PREFERRED EMBODIMENTS

Figure 1:
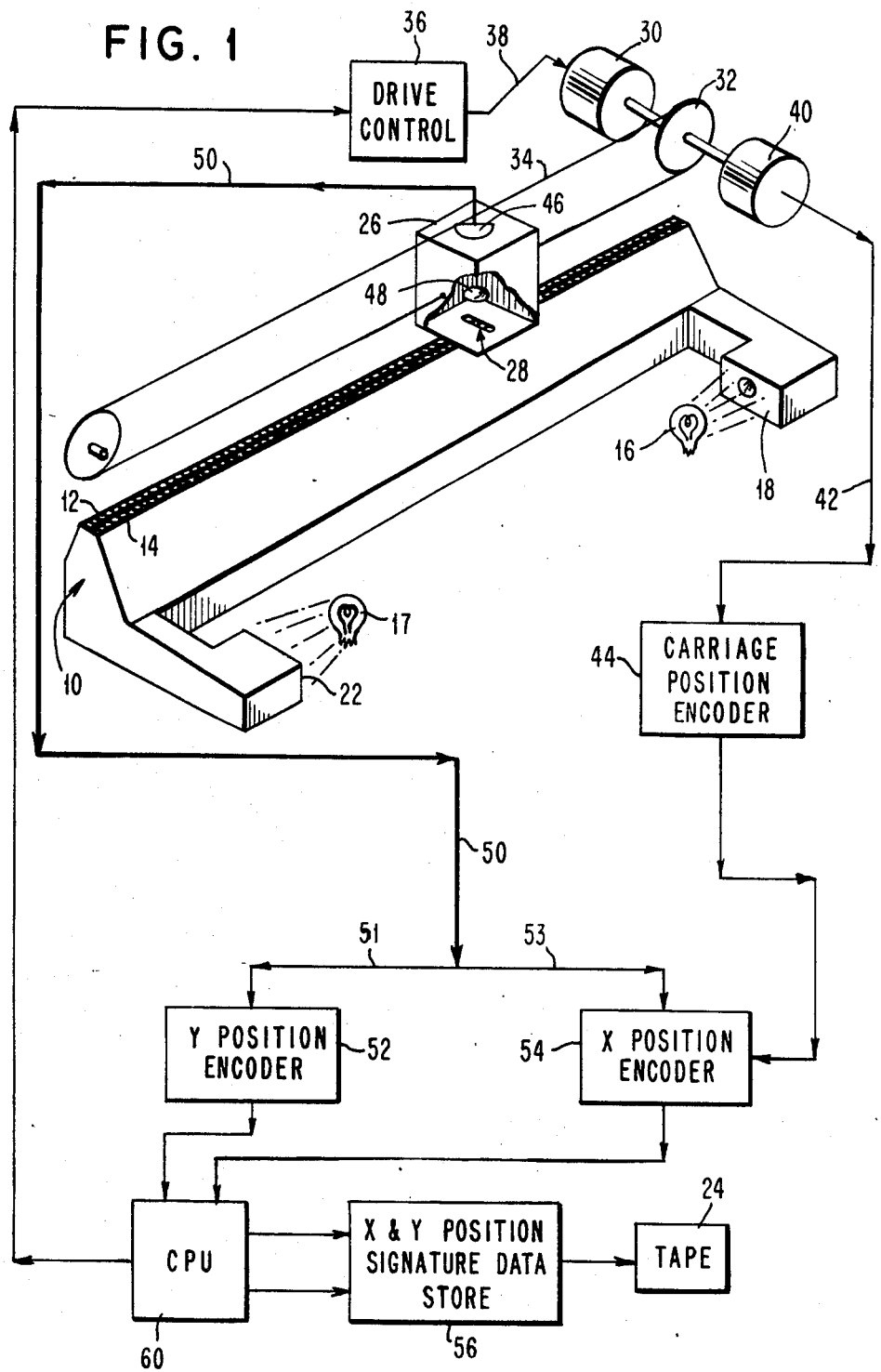
FIG. 1 is a combined perspective view and functional block diagram of the scan head signature generating machine used for producing the scan head signature.
Figure 2:
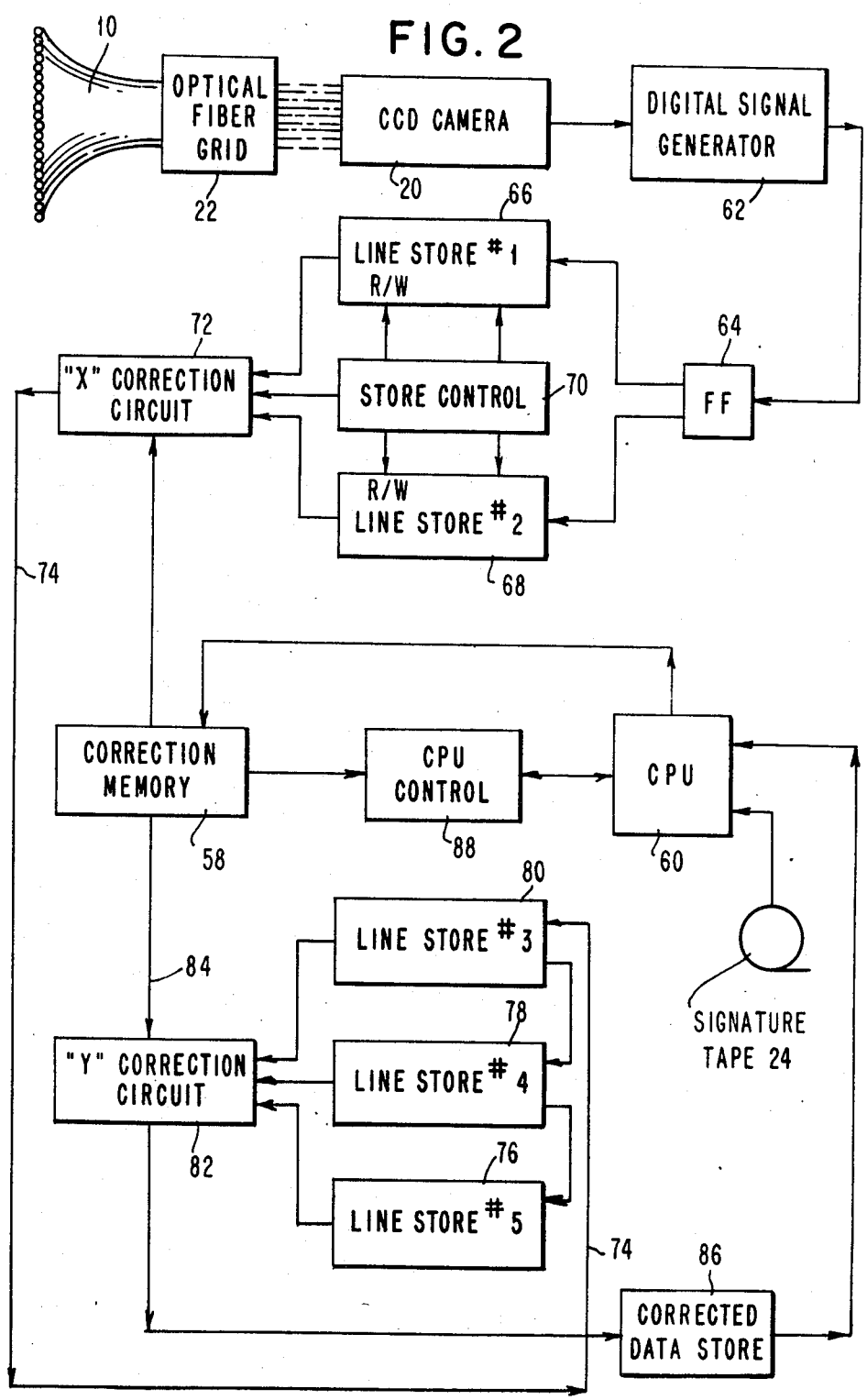
FIG. 2 is a block diagram of the optical fiber scanner correcting system, illustrative of the present invention.

Referring to FIG. 1, there is shown the scan head signature generating machine for determining the optical fiber dimensional data of an optical fiber scan head 10 and formatting such signature data into the appropriate binary computer code or use in the optical fiber scanner correcting system shown in FIG. 2. The optical fiber scan head assembly 10 consists of two subassemblies, an illumination subassembly 12 and a sensor subassembly 14. Each of such subassemblies comprises 10,000 optical fibers. Fiber subassembly 12 is used to illuminate the document while the other subassembly 14 is used to detect the presence of data on the document. For illumination, during the scanning operation, light from an incandescent bulb 16 is focused on the end 18 of the circular bundle of the fibers of the first subassembly 12. The other end of the fibers in the form of a linear array shown by numberal 12, illuminates the document, not shown. The linear array of the second subassembly 14 is used during scanning to sense the presence of the black and white regions on the illuminated document. Data capture occurs as modulated light in the linear array of sensor fibers. The light signals are converted to electronic signals at the grid end 22 of the fibers of the sensing subassembly 14 where they are sensed by a charge coupled device (CCD) camera 20. The fibers of the subassembly 14 are arranged in the matrix grid array 22 shown in FIG. 2 with each optical fiber in the grid being aligned with individual cells of CCD 20.

In this type of scanner head assembly 10, the accuracy of the data is dependent on the ability of the sensor fibers to capture the modulated light signals from the document and the dimensional position of each sensor fiber with respect to a calibration position. Although the manufacture of optional scanners is under close control, there still occurs small, but discernible, errors in fiber location.

Measurements of the dimensions of the optical fiber scan head 10, written as dimensional information that comprises the "signature", is in the form of computer data that is recorded on a computer storage media, such as the magnetic tape 24 or a magnetic diskette. In the scan head signature generating machine shown in FIG. 1, a separate light bulb 17 illuminates the sensor grid 22 such that the other end 14 of the fibers associated with the sensor subassembly is detected for light by a scan carriage 26. It is noted that the bulb 17 is only used when taking a signature of the sensing fibers of the sensing subassembly 14. During normal scanning of documents, the bulb 16 is used to illuminate the circular bundle of fibers at the end 18 of the illumination subassembly 12.

Scan carriage 26 has a slit opening 28 at its bottom for receiving and detecting the light from the individual optical fibers of the sensor subassembly 14 as the scan carriage 26 is moved by a D.C. motor 30 which drives a pulley system 32 and pulley 34. D.C. motor 30 is driven from a drive control 36 via lines 38 under control of the CPU 60. A rotary shaft encoder 40 provides an electrical indication of the actual position of the scan carriage 26 and the light slit 28 along the scanning head 10 on lines 42 to a carriage position encoder 44 which provides the indication of where the scan carriage 26 and the light slit 28 is located along the scanning head 10 for determining the exact X position along such axis as each fiber is being measured. The exact position in the X direction is provided by X position encoder 54 whereas the exact position of each fiber in the Y direction is provided by Y position encoder 52. Since the optical fiber scan head has its fibers arranged in a nominal straight line across the document plane, and each fiber has an X position and a Y position, the scan light slit 28 in the carriage 26 allows light to pass through a lens 48 to a photodetector 46 that measures or senses the actual X and Y position data through the slit 28 and provides this data via lines 50 leading via lines 51 and 53, respectively, to X position encoder 54 and Y position encoder 52. X position encoder 54 determines the actual X position for each optical fiber including the variation of each fiber from its nominal X position with respect to its X base line calibration position by sensing the signal for the maximum light received through the slit 28 and focused on the photodetector 46. Similarly, Y position encoder 52 determines the actual Y position for each optical fiber including the variation of each fiber from its nominal Y position with respect to its Y base line calibration position. This X and Y position data is passed to the CPU 60 where it is translated to digital form and referred to herein as the "Signature" of the optical fiber scan head. The data from the CPU 60 is respectively stored in an X and Y position signature data store 56.

It should be understood that other forms and variations of the signature generating machine shown in FIG. 1 can be employed. For example, the signature data can be obtained by any of a number of precise measuring arrangements, either by measuring the location of the outside diameter of each fiber, or by measuring the location of maximum brightness of the fibers when transmitting light by optical means as is shown in the signature generating machine in FIG. 1. Also, the signature data in store 56 can be stored on tape 24 or other suitable storage means after which it is used in the optical fiber scanner correcting system shown in FIG. 2.

Referring to FIG. 2, the system of the present invention employs the signature data stored on signature tape 24 to obtain correction of the scan file. The signature data is loaded into a correction memory 58 by a scanner computer 60. In correction memory 58 is a 10,000 position store that contains binary signature data as described above. To achieve signature correction of scanned data as shown and described below in FIGS. 5(d) and 6(d) where the fibers are respectively less than or more than the nominal diameter, the CCD camera 20 passes the scanned data from digital signal generator 62 to a digital directing circuit 64 comprising a flip flop. The data for each consecutive scan line is passed, alternatingly, to line store #1, (66) and #2 (68). The data is passed from each line store 66, 68 under control of a store control 70. Pulses are either added to or deleted from the data stream by an "X" correction circuit 72 based on the signature in the correction memory 58. Binary pulses are deleted as they occur while the pulses that are added are repeats in binary form of the preceding pulse.

Figure 2A:
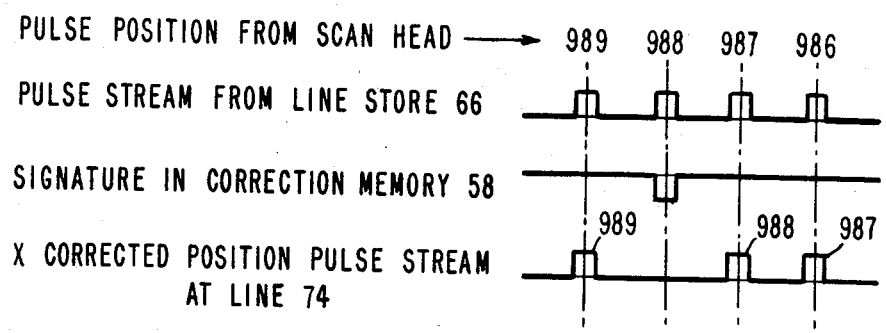
FIGS. 2(a) and 2(b) graphically show the "X" correction process for selectively deleting one binary pulse of the correction signature from the pulse stream.
Figure 2B:
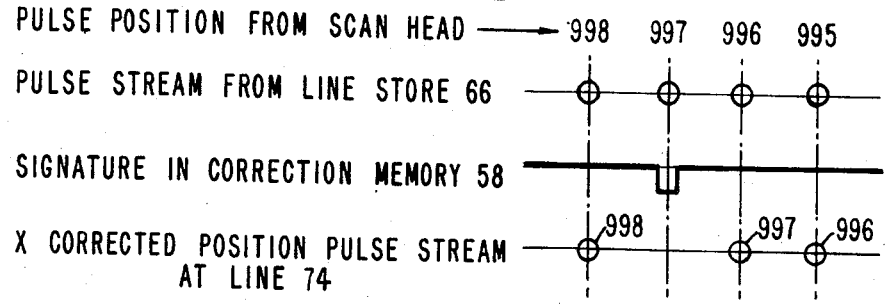
Figure 2C:
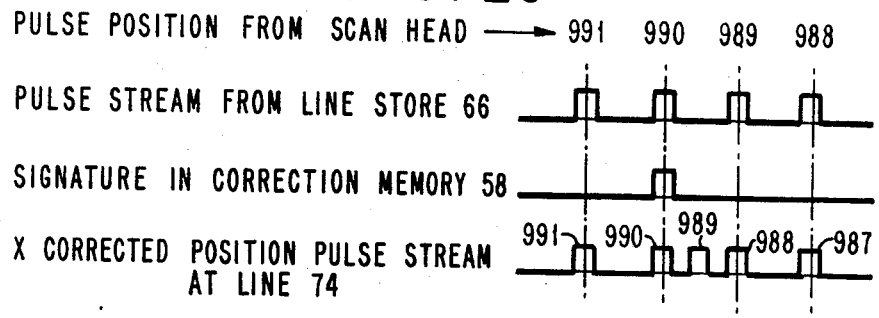
FIGS. 2(c) and 2(d) graphically show the "X" correction process for selectively adding one binary pulse of the correction signature into the pulse stream.
Figure 2D:
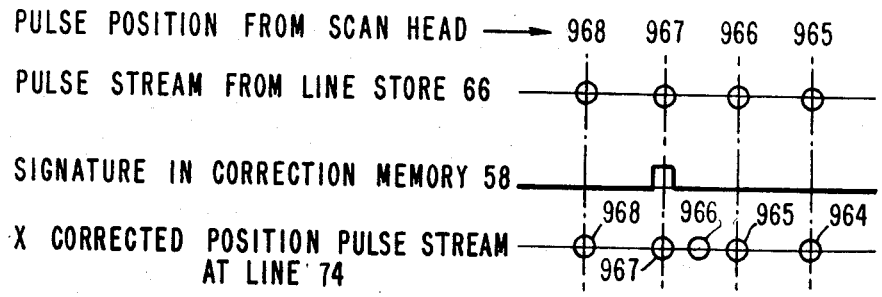

To accomplish deleting of one pulse, the correcting circuit 72 will fetch one at a time either binary "0" or "1" pulses from the line store 66 or 68. Because of the correction signature in the correction memory 58, the correction circuit 72 will blank out selected binary signals and in each instance tag the next signal as the one in sequence with the signal that is coincident with the signature correcting pulse. This process is shown graphically in FIGS. 2(a) and 2(b). To accomplish the addition of one pulse the correcting circuit 72 will fetch, one at a time, either binary "0" or "1" from the line store 66 or 68. Because of the correction signature in the correction memory 58, the correction circuit 72 will be conditioned to add or insert a binary pulse into the pulse stream as shown in FIGS. 2(c) and 2(d).

These requirements maintain the consistency of the binary pulse stream and avoid single binary 1 conditions. The pulse stream is read out of the line stores 66 and 68 at a higher rate than camera speed to allow, when required, packing of data into the pulse stream.

The "X" corrected data flows next on line 74 to the line stores in scan line burst form. The stores have 10,000 positions loaded with the first scan line in store #5, (76), the second scan line in store #4, (78), and the third scan line in store, #3 (80). The three stored pulse streams are passed to a "Y" correction circuit 82 where "Y" signature data is passed from the correction memory 58 on line 84 and used to form a "Y" corrected line from the three lines.

The data from the line stores 80, 78 and 76 is output simultaneously, one pulse at a time, into the Y correction circuit 82 and, based on signature correction data received one pulse at a time on line 84 from the correction memory 58, a Y corrected pulse stream will be generated. This process is shown graphically in FIG. 2(e). In FIG. 2(e) the $-1$, 0 and $+1$ pulse information from the signature correction memory 58 controls, respectively, the output of data from line stores 80, 78 and 76 (lines 1, 2 and 3 shown). If the correction signature is $-1$, line 1 data is outputted of the three lines presented. In the example, there is indicated that a binary "1" is output at position 958 from line 1. At position 963, the signature is binary "0" indicating that data from line 2 at position 963 is output. The corrected scan data is provided in a corrected data store 86 associated with CPU 60. It is noted that a CPU control 88 is also shown.

The CPU control is under the direction of the correction memory and can be used to compensate for variations in optical fiber scanned fibers that result from the document feed mechanism. As noted in FIGS. 4, 5 and 6 to be described below, the stepping of the document produces successive positions that are scanned by the optical fiber linear array. The accuracy and repeatability of the steps influences the resolution in the "Y" direction of the document. For a roll feed mechanism that can be used to step the document, the variation of the rollers from the nominal diameter will cause larger or smaller steps. Linear errors that occur can be corrected by the deletion or the addition of a scan line at regular intervals as the line-by-line scanning occurs. The correction for this type of mechanical errors can be through the CPU control 88 that receives data from the correction memory. Whole lines can be replicated or deleted as they pass to the CPU 60 from the corrected data store 86. This type of correction requires that a document feed signature be obtained and loaded into the correction memory 58 along with the optical fiber signature.

Figure 3:
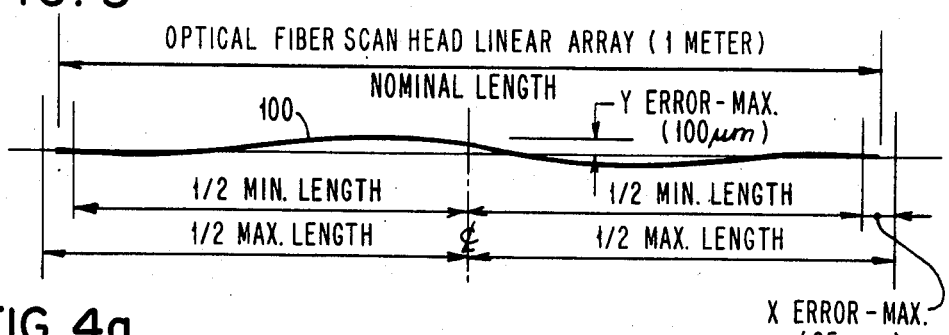
FIG. 3 is a graphical representation of typical X and Y errors along a one meter wide optical fiber linear array on a scan head.

A graphical representation 100 of the "X" and "Y" errors is shown in FIG. 3. It is required that the precise analog dimensional data be converted to digital data by the signature generating machine. Here, an optical fiber scan head linear array of 1 meter nominal length is shown for illustration purposes with signature information for 100 micron diameter fiber scan head. The "Y" error is the position of each optical fiber converted from analog dimension to one of the three digital positions $(-1, 0, +1)$. The "X" error is the position of each optical fiber converted from analog dimension to the nearest 100 micron spacing position. Transition positions where fibers overlap or are missing are indicated $(1, -1)$ from the center of the array outward in both directions. More specifically, data in "Y" direction is converted to $\pm 1$ positional data from a nominal straight line defined from the first to the last fiber in the array. Data in the "X" direction is obtained by comparing each fiber's analog position to the nearest multiple of the fiber diameter. At the multiple positions, where a fiber is shifted and overlaps a previous fiber, a $-1$ assignment is made to the overlapped fiber. Where a gap occurs because of a shift in a fiber position and a nominal position is unoccupied, a $+1$ assignment is made to the shifted fiber. All other fibers on multiple positions are assigned the "0" notation. The binary data assigned to each numbered fiber is used in the data capture system.

Figure 4A:
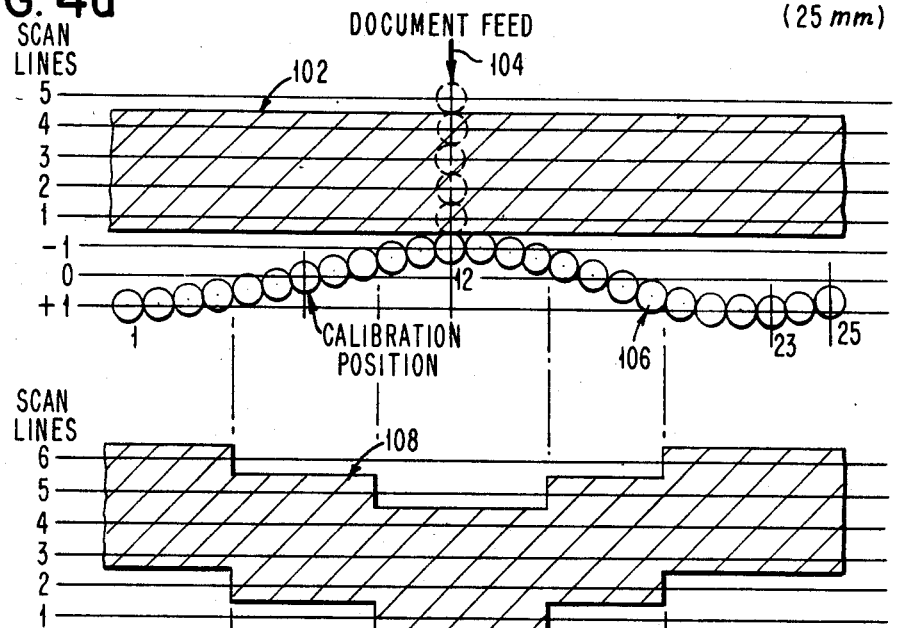
FIG. 4(a) shows a document and optical fiber arrangement with a document mark to be scanned.
Figure 4A:
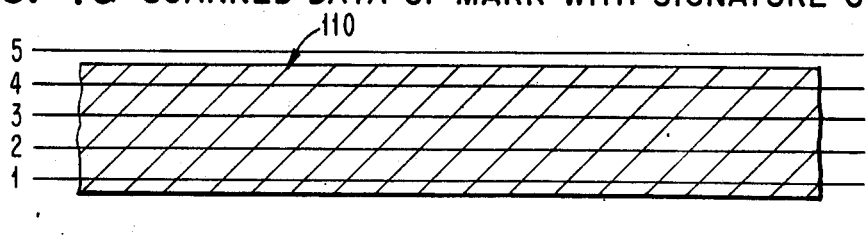

FIGS. 4(a), (b) and (c) illustrate the effect of positional errors in the "Y" direction is to introduce artificial steps in the scanned data. The process causing the effect is shown graphically on FIG. 4(a) where a four fiber wide mark 102 on a document is positioned to be scanned by an optical fiber array 106 that has "Y" direction error. Fiber #12 will be the first to detect the presence of the mark as the document is stepped in direction indicated by arrow 104 under the fiber array 106. FIG. 4(b) shows the resulting scanned data 108 without signature correction. Fibers 1–4 and 20–25 are the last to sense the mark at scan line six. The "Y" signature is shown in FIG. 4(c) where the analog "Y" dimensions have been digitized as as previously described. FIG. 4(d) shows the resultant scanned data of mark 110, signature correction is applied.

FIGS. 5(a), (b) and (c) and 6(a), (b) and (c) illustrate the "X" direction correction. The fibers in the sensor array can be either smaller or larger than the nominal diameter specified to achieve a specific resolution. When the fibers are less than the nominal diameter, there will be a higher resolution as shown in FIGS. 5(a), (b) and (c). Scanning a mark 112 in this case will cause an increase in the scanned data 114 as shown in FIG. 5(b) where there is no signature correction. The excess data that is captured must be eliminated in the scanned file in order to achieve the design resolution. For the example in FIG. 5, data at fibers −9, −6, −3, +3 and +7 in array 116 must be deleted from the line scan data as shown in FIG. 5(c). This is required because these fibers overlap adjacent fibers when assigned to the nearest nominal fiber position. The scanned data 118 of the mark with signature correction is shown in FIG. 5(d).

The condition where fibers are larger than the nominal diameter is shown in FIG. 6. The mark 120 and the fiber array 122 are shown in FIG. 6(a) for this case, the scanned file 124 has a reduced width as shown in FIG. 6(b). The "X" signature identifies position −7, −3, and +2 as missing data as shown in FIG. 6(c). Applying the signature correction will result in a scanned data file 126 that is the same as the original mark 120 in the "X" direction, as shown in FIG. 6(d).

FIG. 4(d) shows corrected data that results from the signature in FIG. 4(c) to be described below. The correction information, −1 for counterfeed correction, +1 for feed correction and 0 for no change is applied as required. (For the example in FIG. 4, fiber data 10 to 15 will be counterfeed corrected, +1 for feed correction and 0 for no change is applied as required.) For the example in FIG. 4, fiber data 10 to 15 will be counterfeed corrected in the Y correcting circuit 82, data for fibers 5 to 9 and 16 to 19 are unchanged and the remaining data are forward corrected. This line pulse stream is passed to the corrected data store 86. Lines 2 and 3 are then shifted to line stores #5 (76) and #4 (78), respectively, and line 4 is loaded into store #3 (80), allowing the correction process to be repeated. The CPU control 88 permits corrected pulse streams to be passed to the main CPU where storage or image processing of the scanned data occurs.

In this fashion, the system of the present invention permits the use of optical fiber scan heads for high precision scanning applications by means of the method and system for correction of manufacturing deviations in optical fiber linear arrays. The deviations from nominal spacing in optical fiber scanners are corrected by a system employing solid state, high speed micro-electronic circuitry. The system uses the data from measurements of an optical fiber scan head to subsequently correct the digitized data obtained from a CCD camera that detects signals from the measured scan head when in use as a scanner.

While the invention has been described above with respect to its preferred embodiments, it should be understood that other forms and embodiments may be made without departing from the spirit and scope of the invention. For example, while the system has been described with respect to FIGS. 5(a) and 6(a), respectively, for correcting the positional errors when the scan head fibers have diameters that are less than or more than the nominal fiber diameter, the present invention also contemplates the correction of optical fiber arrays where the gaps or other spaces between adjacent fibers cause similar positional errors.

What is claimed is:

1. System for correcting the manufacturing errors and variations in the mechanical positional alignment and spacing of optical fibers in the scanning head of a document video scanning system, comprising:

means for determining a scan head signature representing the actual mechanical positional data for each of said optical fibers including the variation of each fiber from its nominal X and Y positions with respect to X and Y axes, said means for determining said scan head signature including light sensing means for measuring the position of the light output from the ends of each optical fiber to determine the actual mechanical X and Y positions of each fiber;

a signature correction memory for storing said scan head signature data;

means for scanning consecutive lines on a document with said optical fiber scanning head to produce a stream of digital signal scan line data; and correction circuit means for continuously modifying said scan line data by using said scan head signature data stored in said signature correction memory to correct the positions of said stream of scan line data to thereby provide a true video scan of the document data, said correction circuit means including an X position decoder and a Y position decoder for respectively receiving actual X and Y positional data from said light sensing means and determining the variation of each optical fiber from its nominal X and Y positions with respect to said X and Y axes.

2. System as recited in claim 1, wherein said X and Y position decoders comprises a digital position decoder for converting said scan head signature to binary positional data assigned to each numbered optical fiber.

3. System as recited in claim 1, further comprising means for storing individual lines of said scan line data for applying consecutively to said correction circuit means.

4. System as recited in claim 1, wherein said correction circuit means comprises an X correction circuit for receiving X positional data from said signature correction memory and applying said signature data to said scan line data to produce a corrected scan data file which is true to the original data being scanned on said document.

5. System as recited in claim 1, wherein said correction circuit means comprises a Y correction circuit for receiving Y positioned data from said signature correction memory and applying said signature data to said scan line data to produce a corrected scan data file which is true to the data being scanned on said document.

6. System as recited in claim 1, wherein said means for determining a scan head signature representing the actual positional data for each of said optical fibers includes means for measuring the actual X and Y position of each optical fiber with respect to its variation from a reference position.

7. System as recited in claim 1, wherein said means for determining a scan head signature representing the actual positional data for each of said optical fibers includes means for measuring the actual X position of each optical fiber with respect to its variation from its nominal X position along an X axis direction.

8. System as recited in claim 1, further comprising correction memory means for storing roll feed correction data representative of the linear errors that occur due to the variation of document feed rollers from their nominal diameter, and control means for using said roll feed correction data to correct said linear errors by adding or deleting a scan line at regular scan intervals as line by line scanning occurs.

9. System for correcting the manufacturing errors and variations in the mechanical positional alignment and spacing of optical fibers in the scanning head of a document video scanning system, comprising:

signature correction memory means for storing a scan head signature representing the actual mechanical positional data for each of said optical fibers including the variation of each fiber from its nominal X and Y positions with respect to its X and Y axes, said signature correction memory means including a scan head signature representing X and Y position data for each optical fiber;

means for scanning consecutive lines on a document with said optical fiber scanning head to produce a stream of digital signal scan line data; and correction circuit means for continuously modifying said scan line data by using said scan head signature data stored in said signature correction memory to correct the positions of said stream and scan line data to thereby provide a true video scan of the document data, said correction circuit means including means for storing consecutive lines of scan line data received from said scanning head, and means for correcting the X and Y positions of said scan line data using said scan head signature.

10. System as recited in claim 9, wherein said scan head includes a linear array of optical sensing fibers extending generally along an X axis, and said signature correction memory means stores said scan head signature representing the actual X position for each optical fiber with respect to its nominal X base line calibration position.

11. System for correcting the manufacturing errors and variations in the positional alignment and spacing of optical fibers in the scanning head of a document video scanning system, comprising:

means for determining a scan head signature representing the actual X and Y positional data for each of said optical fibers including the physical variation of each fiber from its nominal X and Y position with respect to X and Y axes, said means for determining said scan head signature including light sensing means for measuring the position of the light output from the ends of each optical fiber on said scanning head to determine the actual position of each fiber;

digital position decoder means for converting said X and Y scan head signature to binary positional data assigned to each numbered optical fiber;

a signature correction memory for storing said scan head data;

means for scanning consecutive lines on a document with said optical fiber scanning head to produce a stream of digital signal scan line data; and correction circuit means for continuously modifying said scan line data by using said scan head signature data stored in said signature correction memory to correct the X and Y positions of said stream of scan line data to thereby provide a true video scan of the document data.

12. A method for correcting the manufacturing errors and variations in the positional alignment and spacing of optical fibers in the scanning head of a document video scanning system, comprising;

determining a scan head signature by measuring and storing the actual X and Y positional data for each optical fiber including the variation of each fiber from its nominal X and Y base line calibration position;

storing said scan head signature data in a signature correction memory;

scanning consecutive lines on a document with said optical fiber scanning head to produce a stream of digital signal scan line data; and continuously modifying said scan line data by using said head signature data stored in said signature correction memory to correct the X and Y positions of said stream of scan line data to thereby provide a true video scan of the document data.

13. System for correcting the manufacturing errors and variations in the positional alignment and spacing of optical fibers in the scanning head of a document video scanning system, comprising:

means for determining a scan head signature representing the actual positonal data for each of said optical fibers including the variation of each fiber from its nominal position, means for determining said scan head signature including light sensing means for measuring the position of the light output from the ends of each optical fiber on said scanning head to determine the actual position of each fiber;

a signature correction memory for storing said scan head data;

means for scanning consecutive lines on a document with said optical fiber scanning head to produce a stream of digital signal scan line data; and correction circuit means for continuously modifying said scan line data by using said scan head signature data stored in said signature correction memory to correct the positions of said stream of scan line data to thereby provide a true video scan of the document data, said correction circuit means including digital position decoder means for converting said scan head signature to binary positional data assigned to each numbered optical fiber, and said digital position decoder means including an X position decoder and a Y position decoder for respectively receiving actual X and Y positional data from said light sensing means and determining the variation of each optical fiber from its nominal X and Y positions with respect to X and Y axes.

14. System for correcting the manufacturing errors and variations in the positional alignment and spacing of optical fibers in the scanning head of a document video scanning system, comprising:

signature correction memory means for storing a scan head signature representing the actual positional data for each of said optical fibers including the variation of each fiber from its nominal position;

means for scanning consecutive lines on a document with said optical fiber scanning head to produce a stream of digital signal scan line data;

said scan head including a linear array of optical sensing fibers extending generally along an X axis, and said signature correction memory means stores said scan head signature representing the actual X position for each optical fiber with respect to its nominal X base line calibration position;

correction circuit means for continuously modifying said scan line data by using said scan head signature data stored in said signature correction memory to correct the positions of said stream and scan line data to thereby provide a true video scan of the document data, said correction circuit means including line store means for storing consecutive lines of scan line data received from said scanning head, and a X correction circuit for correcting the X positions of said scan line data using said scan head signature; and said signature correction memory means further including a scan head signature representing also Y position data for each optical fiber, and said correction circuit means includes a Y correction circuit connected to a further line store means for storing consecutive lines of scan line data after said data has been corrected for X positions using said scan head signature, said Y correction circuit providing a Y correction of scan line data after said X correction circuit has made an X correction.

15. A method for correcting the manufacturing errors and variations in the positional alignment and spacing of optical fibers in the scanning head of a document video scanning system, comprising:

determining a scan head signature by measuring and storing the actual X and Y positional data for each optical fiber including the variation of each fiber from its nominal X and Y base line calibration position, said X and Y scan head signature being converted to binary positional data assigned to each numbered optical fiber with respect to a nominal straight line in the case of Y directional data, or with respect to the nearest mulitple of the fiber diameter in the case of X directional data;

storing said scan head signature data in a signature correction memory;

scanning consecutive lines on a document with said optical fiber scanning head to produce a stream of digital signal scan line data; and continuously modifying said scan line data by using said head signature data stored in said signature correction memory to correct the X and Y positions of said stream of scan line data to thereby provide a true video scan of the document data.

* * * * *